United States Patent
Le et al.

(10) Patent No.: US 8,104,161 B2
(45) Date of Patent: Jan. 31, 2012

(54) METHOD OF PREASSEMBLING AND INSTALLING HYDRAULIC SUBASSEMBLIES

(75) Inventors: Hieu T. Le, St. Charles, MO (US); Raymond J. Slesinski, Arnold, MO (US)

(73) Assignee: The Boeing Company, Chicago, IL (US)

( * ) Notice: Subject to any disclaimer, the term of this patent is extended or adjusted under 35 U.S.C. 154(b) by 1517 days.

(21) Appl. No.: 11/508,664

(22) Filed: Aug. 23, 2006

(65) Prior Publication Data
US 2008/0052890 A1 Mar. 6, 2008

(51) Int. Cl.
*B62D 65/02* (2006.01)

(52) U.S. Cl. .............. 29/468; 29/469; 29/559; 29/281.1

(58) Field of Classification Search .................... 29/464, 29/468, 469, 559, 428, 281.1, 282, 890.124
See application file for complete search history.

(56) References Cited

U.S. PATENT DOCUMENTS 3,549,031 A * 12/1970 Hansen et al. ................ 414/737
5,135,208 A * 8/1992 Diskin .......................... 269/130
* cited by examiner

*Primary Examiner* — Livius R Cazan

(57) ABSTRACT

A hydraulic subassembly is preassembled outside the vehicle into which it is later installed, using an assembly tool. The components of the subassembly are fastened in predetermined positions on the assembly tool, following which hydraulic connections are made between the components. The completed subassembly is fastened to a pickup tool and then disconnected from the assembly tool, allowing an assembly operator to lift the subassembly away from the assembly tool and carry it to the vehicle for installation. The pickup tool is also used to position and hold the subassembly within the vehicle while the subassembly is being connected to hydraulic systems on the vehicle. Following installation of the subassembly, the pickup tool is unfastened from the subassembly and removed from the vehicle.

16 Claims, 7 Drawing Sheets

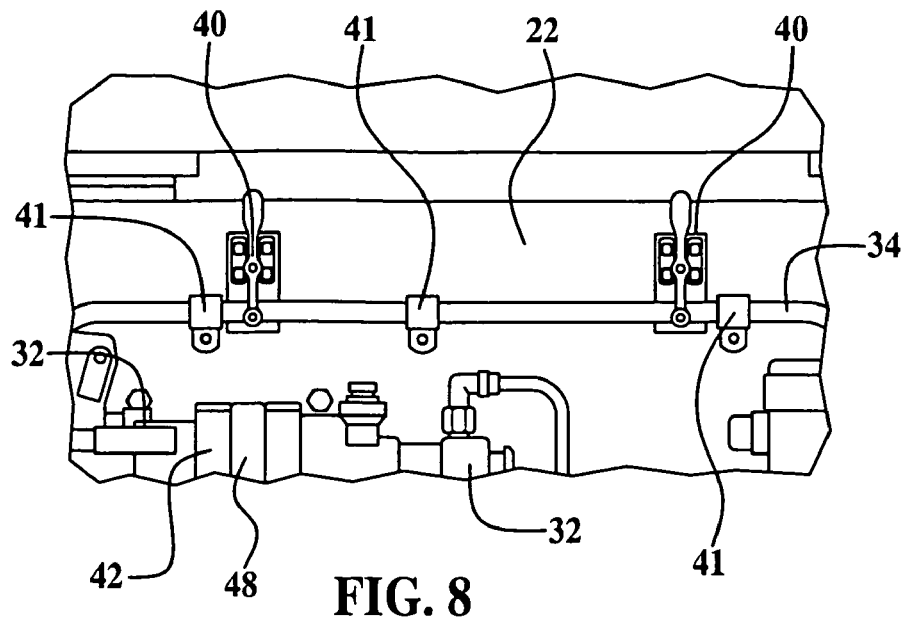
FIG. 8
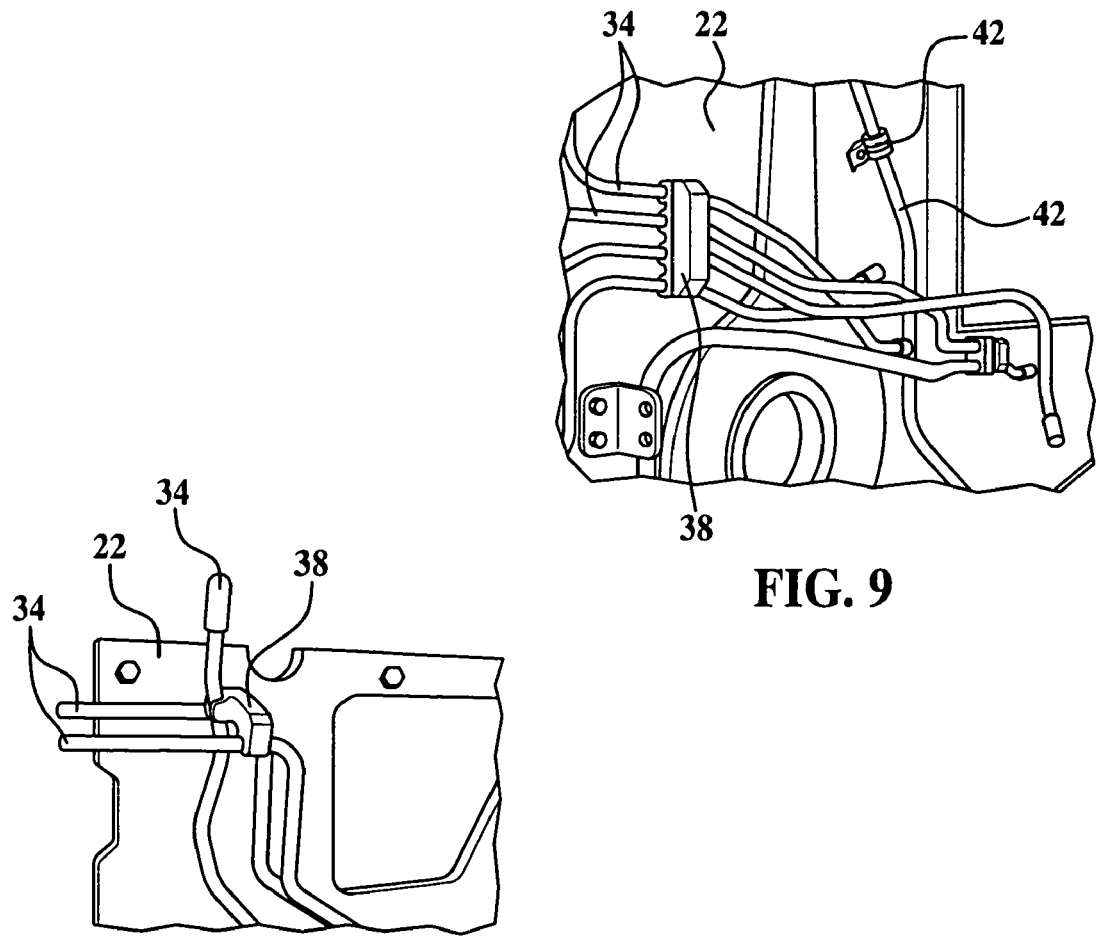
FIG. 9
FIG. 10

METHOD OF PREASSEMBLING AND INSTALLING HYDRAULIC SUBASSEMBLIES

FIELD OF THE INVENTION

This invention generally relates to hydraulic systems, especially those installed in confined quarters such as inside aircraft, and deals more particularly with a method of preassembling hydraulic components into a subassembly, and installing the subassembly.

BACKGROUND OF THE INVENTION

Sophisticated vehicles such as military and commercial aircraft make extensive use of complex hydraulic systems and subsystems. The components of these systems, which typically include valves, actuators, fittings and hydraulic tubing, are often assembled, piece-by-piece in confined spaces within the aircraft. Assembly of the components in this non-ergonomic environment slows the assembly process and can interfere with other necessary assembly processes inside the aircraft, since the assembly worker must spend a considerable amount of time in the aircraft assembling the hydraulic components. Personal injuries are more likely to occur when the assembly operators are forced to work inside the aircraft, and the long cycle times required to complete assembly operations can have an adverse impact on the overall aircraft assembly critical path.

It would therefore be desirable to employ a method of assembling hydraulic components that can be performed outside of the aircraft in a more ergonomic environment. The present invention is directed toward satisfying this objective.

SUMMARY OF THE INVENTION

In accordance with one aspect of the invention, a method is provided of installing a hydraulic subassembly in a vehicle comprising the steps of: preassembling the subassembly, including fastening components of the subassembly in predetermined positions on an assembly tool; fastening the preassembled subassembly to a pickup tool after the components have been fastened to the assembly tool; unfastening the components from the assembly tool after the subassembly has been fastened to the pickup tool; and, picking up and then installing the preassembled subassembly in the vehicle using the pickup tool. The preassembly process includes interconnecting the hydraulic components using rigid hydraulic tubes. The predetermined positions of the components on the assembly tool correspond to the special relationship of the components before they are installed on the vehicle as a subassembly. The components are fastened to the assembly tool using either clamps or screws, and the tubing is swaged to make permanent connections between the components. The pickup tool is preferably in the form of a plate that is releasably strapped to at least certain of the components so that when the components are unfastened from the assembly tool, the entire subassembly can be lifted using the pickup tool. The pickup tool provides the subassembly with rigidity after it is removed from the assembly tool, and is used to carry the subassembly into the vehicle and position it for final installation.

According to another aspect of the invention, a method is provided for assembling and installing a hydraulic subassembly in a vehicle, comprising the steps of: preassembling the subassembly on an assembly tool outside the vehicle, including releasably fastening the components to the assembly tool and forming rigid connections between the components; fastening the subassembly to a pickup tool; unfastening the components from the assembly tool; and, then picking up and installing the subassembly in the vehicle using the pickup tool. The pickup tool is preferably fastened to the components using releasable straps.

According to still another aspect of the invention, a method is provided of installing a hydraulic subassembly inside an aircraft, comprising the steps of: positioning hydraulic components respectively in predetermined positions on an assembly tool; fastening the hydraulic components to the assembly tool; making hydraulic connections between the hydraulic components to form a subassembly; fastening the subassembly to a pickup tool; unfastening the subassembly from the assembly tool; using the pickup tool to pickup the subassembly from the assembly tool; transporting the subassembly to the vehicle using the pickup tool; and, using the pickup tool to position the subassembly for installation inside the aircraft. The hydraulic connections are made by clamping the tubes on the assembly tool then swaging rigid hydraulic tubes. The pickup tool is fastened to the subassembly using straps which can be later released from the subassembly after the installation is complete.

The method of the present invention is particularly advantageous in that the assembly worker can assemble the components of the subassembly outside of the aircraft, in an optimized, ergonomic environment. The use of an assembly tool for laying out the components of the subassembly assures that the components, as well as the interconnecting tubes are in precisely located positions before the subassembly is installed on the vehicle. The assembly worker is able to connect the components more rapidly and check both layout and connections more easily.

Various additional objects, features and advantages of the present invention can be more fully appreciated with reference to the detailed description and accompanying drawings that follow.

BRIEF DESCRIPTION OF THE DRAWINGS

FIG. 8 is an enlarged, fragmentary view showing P-clamps having been installed on one of the tubes.

FIG. 9 is a fragmentary, perspective view of one set of tube ends after a stabilizing clip has been installed thereon.

FIG. 10 is a view similar to FIG. 9, but showing another stabilizing clip having been installed on the other set of tube ends.

DETAILED DESCRIPTION OF THE PREFERRED EMBODIMENTS

Figure 1:
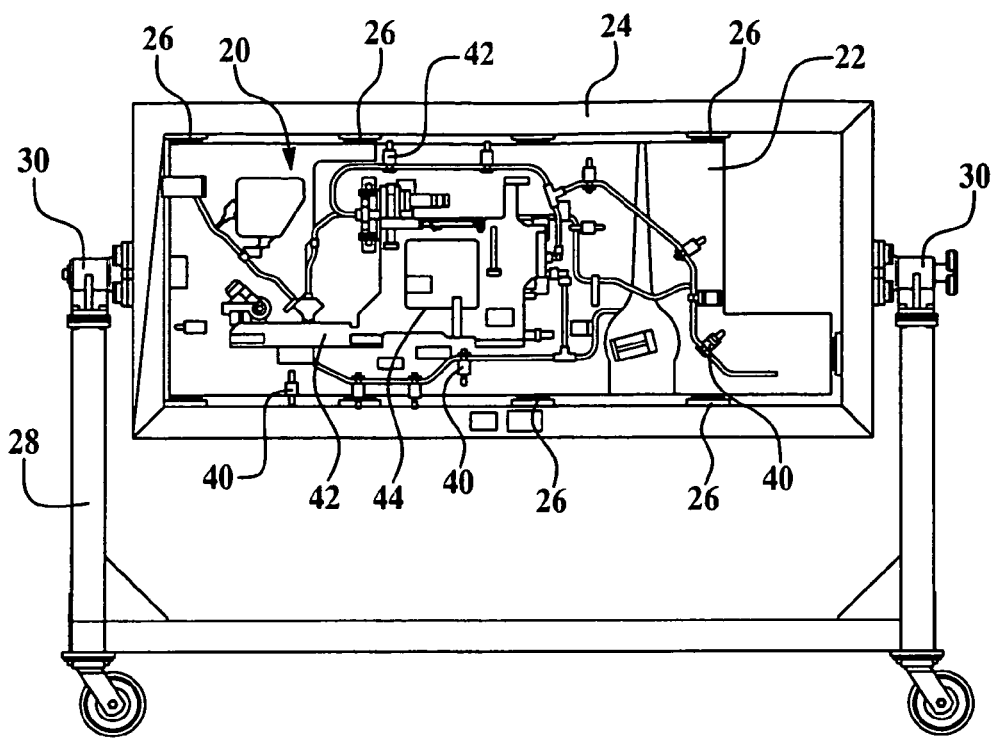
FIG. 1 is a front elevational view of an assembly tool, showing a hydraulic subassembly and pickup tool.

Referring to FIGS. 1-12, the present invention is concerned with a method for preassembling and installing a hydraulic subassembly, generally indicated by the numeral 20, within a vehicle such as an aircraft (not shown), where the installation must be completed within a confined space, such as within a wheel well of an aircraft, for example. The hydraulic subassembly 20 is preassembled outside of the aircraft using an assembly tool 22 which, in the illustrated example, comprises a flat panel or board secured by mounting flanges 26 to a rectangularly shaped, rigid frame 24. The frame 24 is journaled for rotation by bearings 30 on a wheeled trolley 28 constructed of rigid frame members. Bearings 30 allow the frame 24 to be rotated so that the assembly tool 22 can be oriented and accessed by an assembly operator for easy access to all parts of both the front and rear of the assembly tool 22.

The assembly tool 22 may include figures, part names or other indicia (not shown) thereon to aid an assembly worker in placing parts on the tool 22. Alternatively, the assembly tool 22 may comprise a mock up of that portion of the aircraft where the hydraulic subassembly is to be installed.

Figure 2:
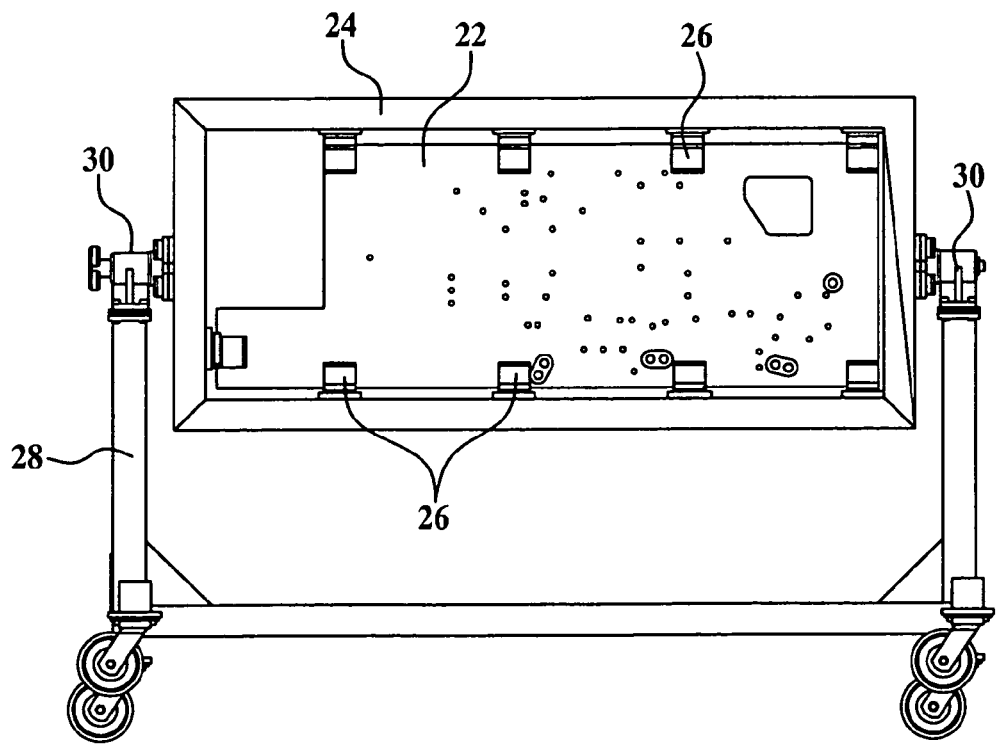
FIG. 2 is a rear elevational view of the assembly tool shown in FIG. 1.
Figure 3:
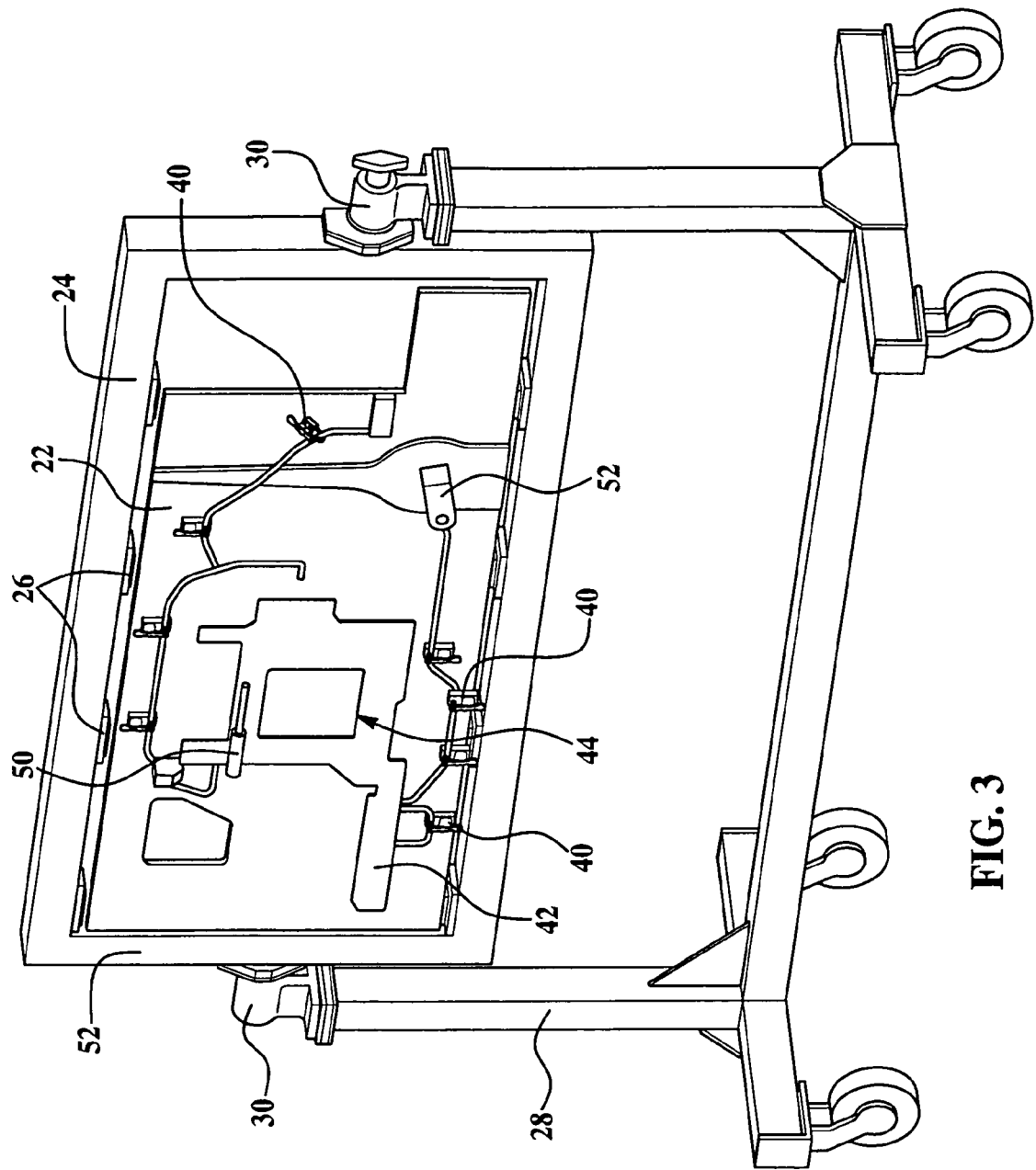
FIG. 3 is a perspective view of the assembly tool shown in FIG. 1.
Figure 4:
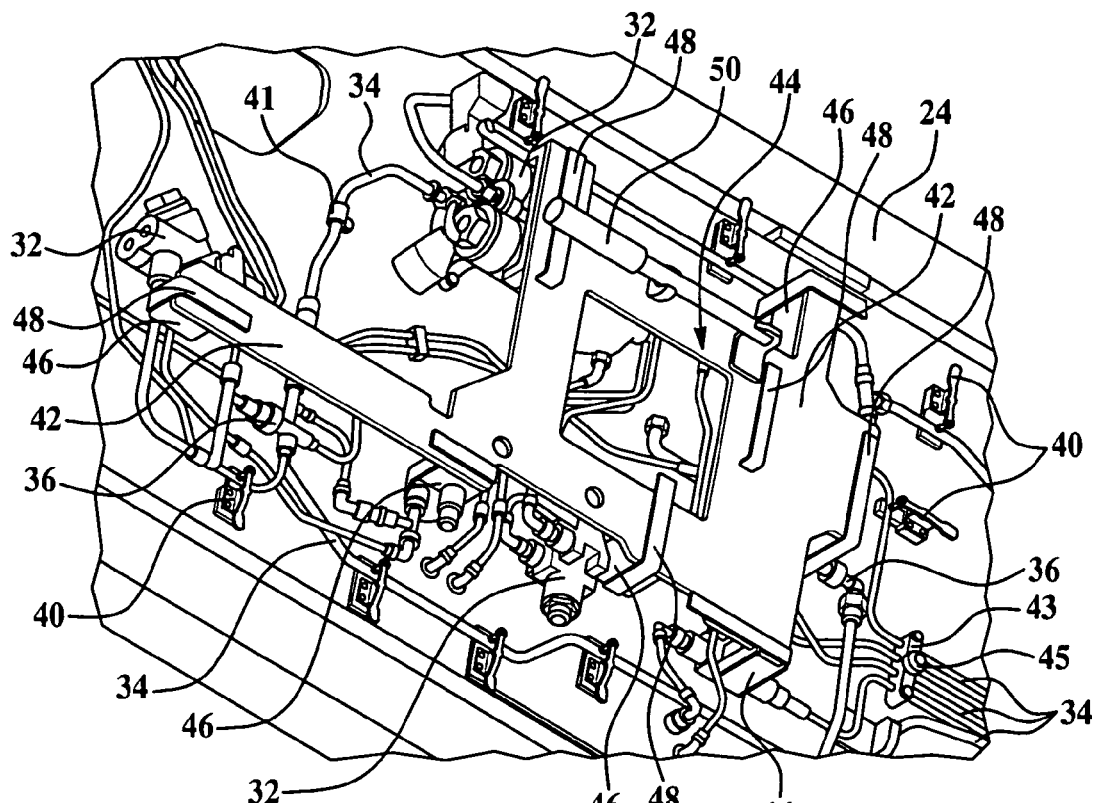
FIG. 4 is an enlarged, fragmentary, perspective view of the assembly tool shown in FIG. 1, depicting details of how the pickup tool is fastened to the hydraulic components of the subassembly.
Figure 5:
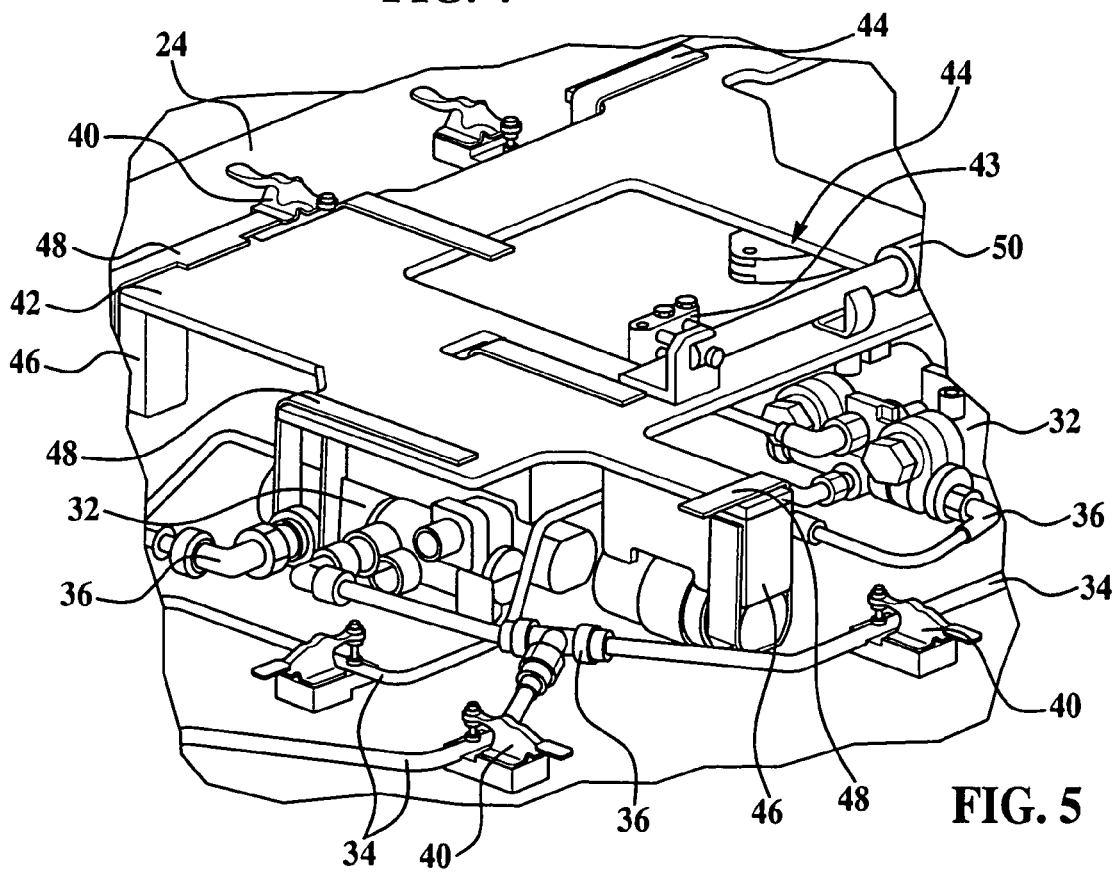
FIG. 5 is a view similar to FIG. 4, but showing with better clarity how the pickup tool is fastened to the hydraulic components using straps and adapters.
Figure 6:
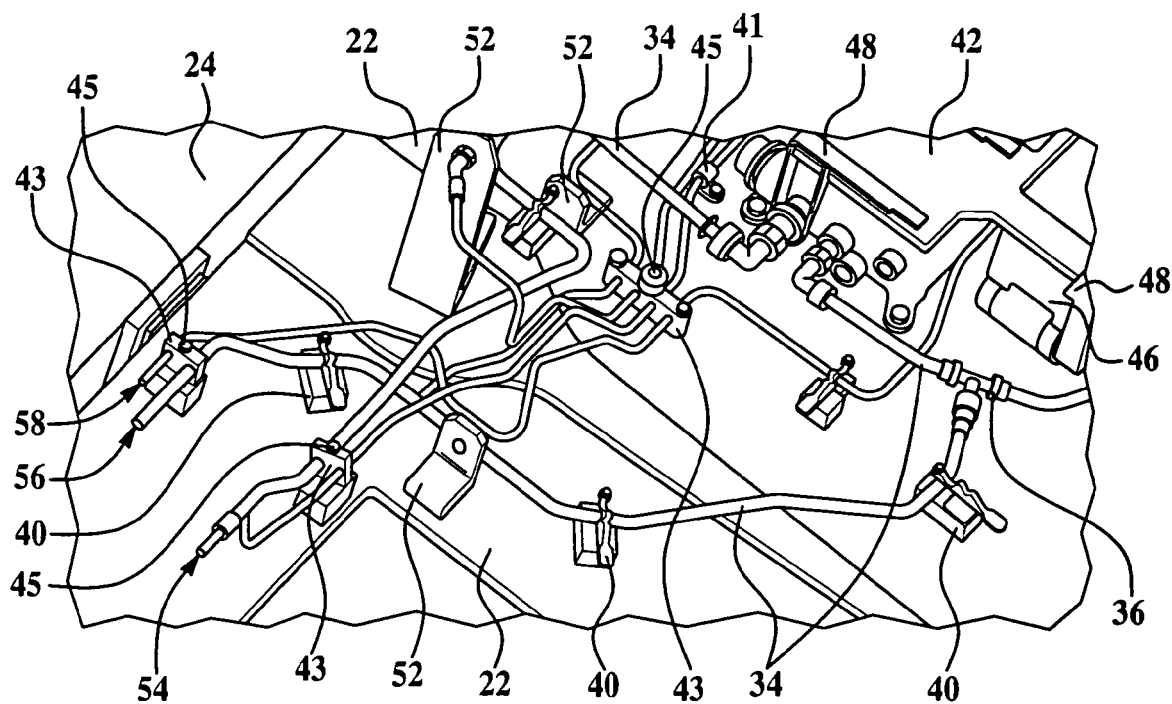
FIG. 6 is an enlarged, fragmentary perspective view of one end of the assembly tool shown in FIG. 1.
Figure 7:
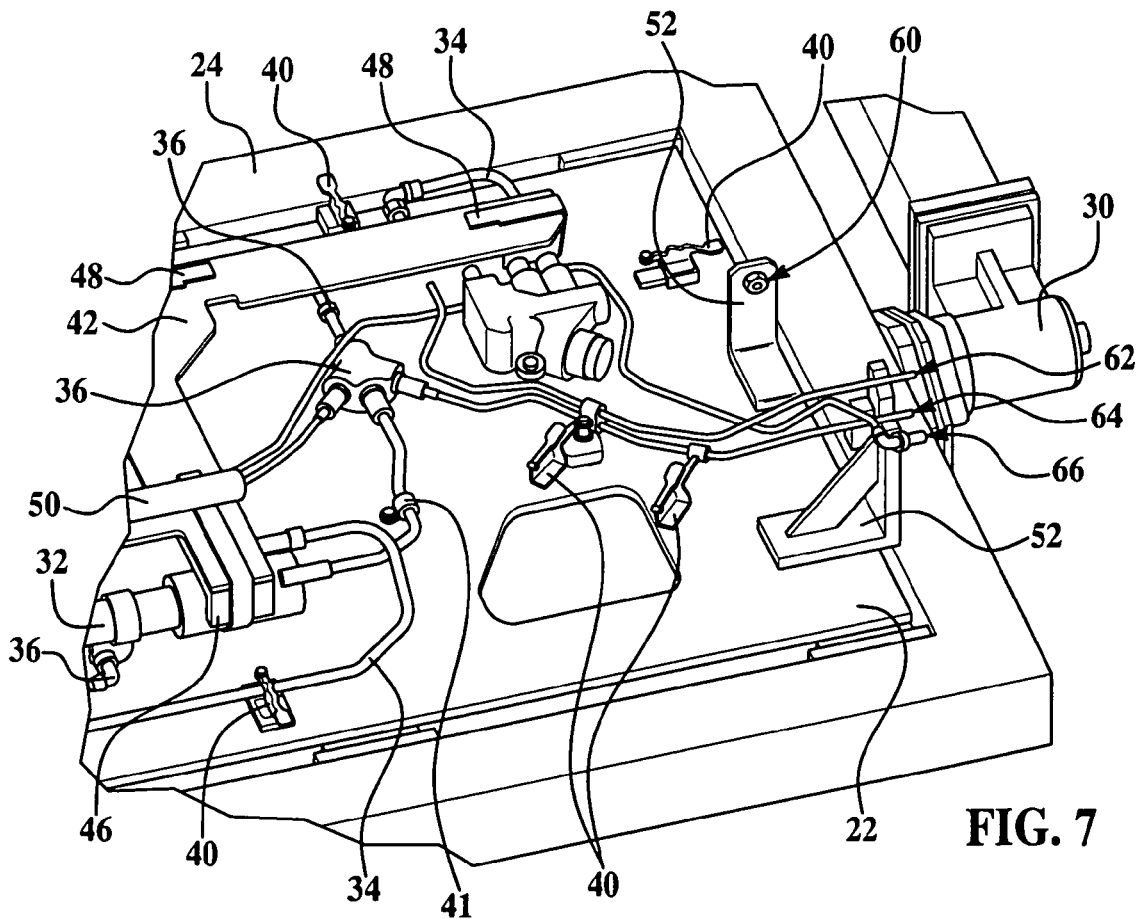
FIG. 7 is a view similar to FIG. 6 but depicting the opposite end of the assembly tool, and showing how toggle clamps secure tube ends to the assembly tool.

As best seen in FIG. 2, the assembly tool 22 includes a number of through-holes for receiving screws that mount later discussed hydraulic components in predetermined positions relative to each other on the assembly tool 22. The exact size, geometry and configuration of the assembly tool 22 will depend upon the particular subassembly that is to be preassembled.

Hydraulic components 32 may comprise flow control devices such as valves or hydraulic motors such as actuators, and are mounted in predetermined locations on the tool 22 using bolts or screws which pass through the assembly tool 22. Rigid, hydraulic tubing 34, formed of titanium, copper, aluminum or steel, and fittings 36 connect the hydraulic components 32. The tubing 34 is temporarily held in place on the assembly tool 22 by toggle clamps 40 on the assembly tool 22 and then permanently swaged. In some cases, the tubing 34 is supported by gauge blocks 52 secured to the assembly tool 22 which precisely position the tubing 34 at special locations that may be position and/or tolerance critical and assure that the final subassembly 20 fits in its intended installation position without interference with other parts of the aircraft. In addition to the gauge blocks 52, toggle clamps 40 can be fastened to the ends of the tubing 34 which are then used to aid in positioning the tube ends during the installation process.

As best seen in FIG. 8, P-clamps 41 are installed over the tubing 34 at various locations on the subassembly 20. The purpose of the P-clamps is to fasten the subassembly 20 to the aircraft during the final installation process. Although the P-clamps 41 can be used to temporarily hold the subassembly 20 on the assembly tool 22, it is preferred to use the toggle clamps 40 to perform this function, in which case the P-lamps 41 are simply installed loosely over the tubing 34 so that they form part of the preassembly 20 but are not secured in place until the subassembly 20 is installed in the aircraft.

In the final installation on the aircraft, spacers 43 may be required to maintain sections of the tubes 32 is a desired position or attitude. Accordingly, these spacers 43 are installed on the tubes 32 and held in place by spacer holders 45 while the subassembly attached to the assembly tool 22. The spacers 43 and holders 45 remain on the subassembly when it is lifted away from the assembly tool 22 and transported to the aircraft. The spacers holders 45 are removed after the subassembly 20 has been installed in the aircraft.

As best seen in FIGS. 9 and 10, clips 38 are removably fastened around near the outer free ends 54, 56, 58 and other sections of the tubing 34, where required, in order to stabilize and rigidify these sections so that the tubing 34 remains in desired positions after the subassembly is removed from the assembly tool 22. The clips 38 may utilize "snap-on" fittings that allow the clips 38 to be installed and removed without the use of tools. In the illustrated example, the hydraulic connection points between the subassembly 20 and hydraulic systems on the aircraft comprise tube ends 54, 56, 58 (FIG. 6) on one end of the subassembly 20, and tube ends 60, 62, 64 and 66 (FIG. 7) on the opposite end of the subassembly 20.

As will be discussed later in more detail, after the hydraulic subassembly 20 has been preassembled on the assembly tool 22, a pickup tool 42 is fastened to the subassembly 20. In the illustrated example, the pickup tool 42 comprises a rigid plate having a central cutout 44, and a geometry that will depend on the particular subassembly 20. The pickup tool 42 is releasably fastened to the subassembly 20 by means, in the illustrated example, of Velcro® straps 48 which are secured to the pickup tool 42 and wrapped around selected ones of the hydraulic components 32. However, various other releasable connections could be used to fasten the pickup tool 42 to the subassembly 20. Adapters 46 are employed between the components 32 and the pickup tool 42 so that the subassembly 20 is solidly connected to the pickup tool 42 by all of the straps 48. The adapters 46 are preferably permanently secured to the pickup tool 42 so that they are separated from the subassembly 20 when the pickup tool 42 is later disconnected from the subassembly 20 following installation in the aircraft. The central cutout 44 in the pickup tool 42 aids in allowing an assembly worker to pickup the subassembly 20 using the pickup tool 42, as well as to access parts of the subassembly 20 during the installation process.

Figure 11:
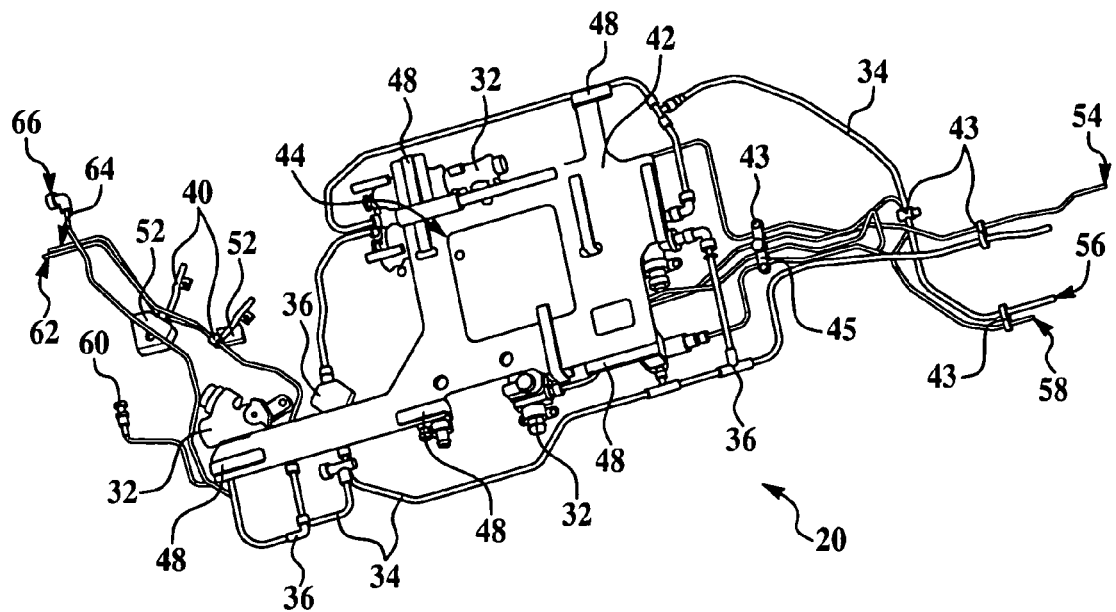
FIG. 11 is a perspective view showing one side of the hydraulic subassembly after having been lifted off of the assembly tool shown in FIG. 1, wherein the pickup tool strapped to the subassembly.
Figure 12:
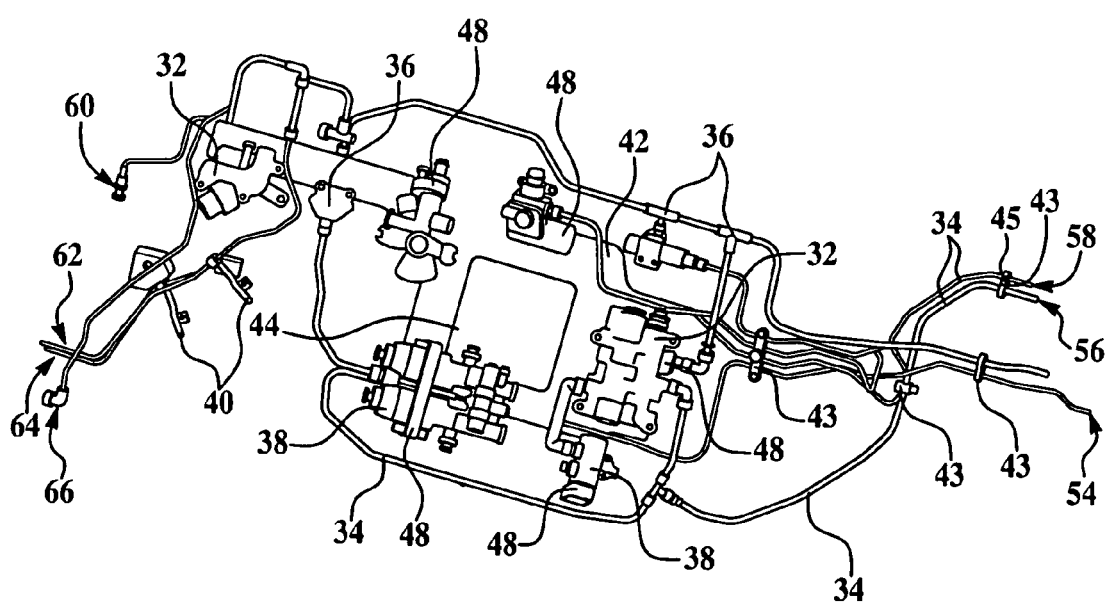
FIG. 12 is a perspective view showing the other opposite side of the subassembly shown in FIG. 8.

As best seen in FIGS. 11 and 12, when the subassembly 20 is removed from the assembly tool 22, the components 32 are strapped to and lifted along with the pickup tool 42. The remaining fittings 36 and tubing 34, which form rigid connections throughout the subassembly 20, maintain their geometries, due in part to spacers 43. Additionally, the outer ends 54, 56, 58, 62, 64 of tubing 34 are stabilized by the clips 38.

Figure 13:
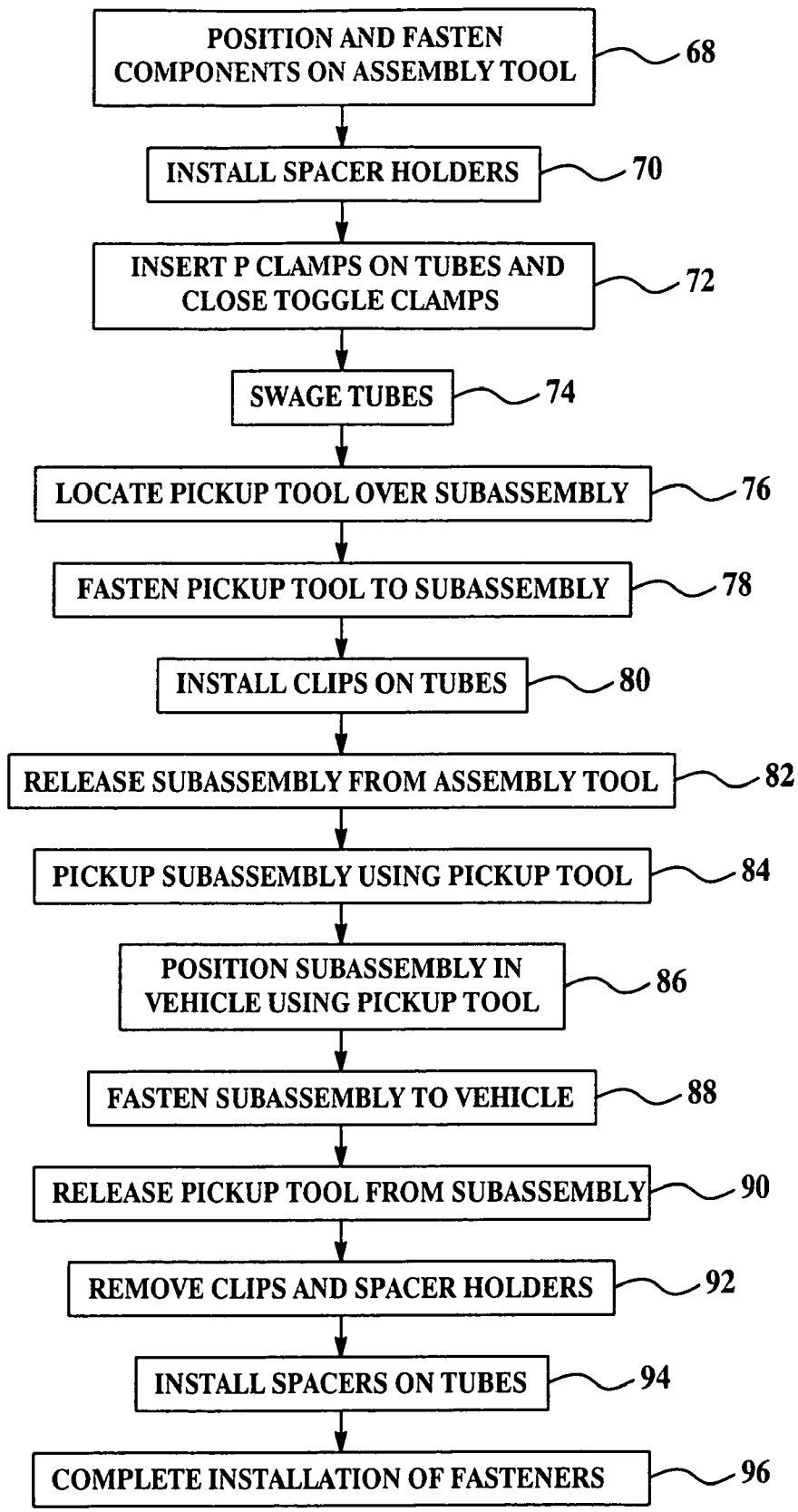
FIG. 13 is a simplified flow chart showing the basic steps of a method for preassembling and installing a hydraulic subassembly in a vehicle, in accordance with the preferred embodiment of the invention.

Attention is now also directed to FIG. 13 where the overall steps of the inventive method are shown. Beginning at step 68, the frame 24 is rotated and locked in place so as to position the assembly tool 22 within easy reach of an assembly worker. The spacer holders 45 are then installed on some of the spacers at step 70, following which the worker installs the P-clamps on the tubing and closes the toggles clamps at step 72. At this point, the assembly worker verifies and checks for proper tube positioning. Then, at step 74, the tubing 34 is completely swaged. Swaging is a process by which tubing is attached to fittings, creating a permanent joint. Upon completion of step 74, the subassembly 20 has been fully preassembled.

Next, the subassembly 20 is prepared for removal from the assembly tool 22. At step 76, the pickup tool 42 is positioned and located over the subassembly 20, and the Velcro® straps 48 are wrapped around the components 32, thereby securing the components 32 (and thus the subassembly 20) to the pickup tool 42, and completing step 78. Next, at step 80, the clips 38 are installed on the tubing 34 to hold and stabilize them as the subassembly 20 is moved away from the assembly tool 22. At step 82, the components 32 are unbolted from the assembly tool 22, and toggle clamps 40 are released, freeing the tubing 34, and causing the subassembly 20 to be disconnected from the assembly tool 22.

Any washers that may be sleeved or at the ends of the tubes 34 are secured so that they will not fall away from the fittings 36, and the assembly operator then picks up the subassembly 20 using the pickup tool 42, as shown at step 84. The operator transports the subassembly 20 by hand using the pickup tool 42 and places the subassembly 20 in its mounting position within the aircraft. The spatial position of the ends of the tubes 34 correspond to fittings (not shown) in the aircraft which connect the subassembly 20 to the aircraft's hydraulic system. As shown at step 86, the subassembly 20 is pre-positioned inside the aircraft, following which at least certain of the components 32 are secured, as with bolts, screws or other fasteners to the aircraft. In the illustrated example, a swing out lever 50 is provided which the assembly operator may swing out into engagement with parts of the aircraft to temporarily support the subassembly 20 in place while the components 32 are fastened to the aircraft. After the hydraulic components 32 have been secured to the aircraft at step 88 the pickup tool 42 is removed from the subassembly 20 by releasing the Velcro® straps 48. The P-clamps 41 can be installed either before or after the pickup tool 42 is removed. Next, at step 92, the clips 38 and spacer holders are removed from the subassembly 20 following which the tube spacers are installed at step 94 and the interconnection of the fasteners is completed at step 96.

Although this invention has been described with respect to certain exemplary embodiments, it is to be understood that the specific embodiments are for purposes of illustration and not limitation, as other variations will occur to those of ordinary skill in the art.

What is claimed is:

1. A method of installing a hydraulic subassembly in a vehicle, comprising the steps of:
   (A) preassembling the subassembly, including releasably fastening hydraulic components of the subassembly in predetermined relationship on an assembly tool, said assembly tool being a panel;
   (B) releasably fastening the preassembled subassembly to a pickup tool after the components have been fastened to the assembly tool, said pickup tool being a plate for carrying and positioning said subassembly in the vehicle;
   (C) unfastening the components from the assembly tool after the preassembled subassembly has been fastened to the pickup tool; and
   (D) picking up and installing the preassembled subassembly in the vehicle using the pickup tool.

2. The method of claim 1, wherein step (A) includes connecting the components with rigid connections.

3. The method of claim 2, wherein step (A) includes connecting the components using rigid hydraulic tubes.

4. The method of claim 1, wherein the predetermined relationship corresponds to the spatial relationship of the components after the subassembly has been installed on the vehicle.

5. The method of claim 1, wherein step (A) includes:
   fastening at least one valve on the assembly tool,
   clamping tubing on the assembly tool, and
   connecting the tubing with the valve.

6. The method of claim 1, wherein step (B) is performed by strapping the pickup tool to at least certain of the hydraulic components.

7. The method of claim 6, wherein step (B) further includes installing a spacer between the pickup tool and the at least certain hydraulic components.

8. The method of claim 1, wherein:
   step (A) includes mounting hydraulic flow control components on the assembly tool and forming rigid connections between the flow control components; and
   step (B) includes releasably securing the pickup tool to at least certain of the flow control components.

9. The method of claim 8, wherein forming the rigid connections is performed by connecting the flow control components using rigid hydraulic tubing.

10. The method of claim 1, wherein step (D) includes:
    connecting at least certain of the hydraulic components to the vehicle, and
    unfastening the pickup tool from the at least certain components.

11. The method of claim 1, wherein step (A) includes:
    installing hydraulic tubing on the assembly tool, and
    installing clips on the outer free ends of the tubing to maintain the outer ends in fixed relationship until the subassembly has been installed in the vehicle.

12. A method of assembling and installing a hydraulic subassembly in a vehicle, comprising the steps of:
    (A) preassembling the subassembly on an assembly tool outside the vehicle, including releasably fastening components of the subassembly to the assembly tool and forming rigid connections between the components, said assembly tool being a panel;
    (B) releasably fastening the preassembled subassembly to a pickup tool, said pickup tool being a plate for carrying and positioning said subassembly in the vehicle;
    (C) unfastening the components from the assembly tool after the preassembled subassembly has been fastened to the pickup tool;
    (D) installing the preassembled subassembly in the vehicle using the pickup tool; and
    (E) removing said pickup tool from said vehicle.

13. The method of claim 12, wherein:
    step (A) includes placing the components in predetermined positions on the assembly tool, and
    forming the rigid interconnections includes swaging tubing forming the rigid interconnections between the components.

14. The method of claim 12, wherein step (B) includes:
    installing spacers between the components and the pickup tool, and
    strapping the components to the combination of the pickup tool and the spacers.

15. The method of claim 12, wherein step (D) includes:
    picking up the preassembled subassembly from the assembly tool using the pickup tool,
    carrying the preassembled subassembly to the vehicle using the pickup tool,
    placing the preassembled subassembly in an installation position in the vehicle using the pickup tool,
    securing at least certain of the components to the vehicle, and
    unfastening the pickup tool from the preassembled subassembly.

16. The method of claim 12, wherein step (B) includes strapping the preassembled subassembly to the pickup tool.

* * * * *